(12) United States Patent
Oren et al.

(10) Patent No.: US 10,400,615 B2
(45) Date of Patent: *Sep. 3, 2019

(54) RETAINING RING GROOVE SUBMERGED INTO DISC BORE OR HUB

(71) Applicant: United Technologies Corporation, Farmington, CT (US)

(72) Inventors: Nicholas Waters Oren, Marlborough, CT (US); Steven D. Porter, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 611 days.

This patent is subject to a terminal disclaimer.

(21) Appl. No.: 15/070,696

(22) Filed: Mar. 15, 2016

(65) Prior Publication Data

US 2017/0268351 A1    Sep. 21, 2017

(51) Int. Cl.
| | | |
|---|---|---|
| *F01D 9/02* | (2006.01) | |
| *F01D 5/02* | (2006.01) | |
| *F02C 3/04* | (2006.01) | |
| *F01D 5/06* | (2006.01) | |
| *F01D 5/30* | (2006.01) | |

(52) U.S. Cl.
CPC ............. *F01D 9/02* (2013.01); *F01D 5/02* (2013.01); *F01D 5/026* (2013.01); *F01D 5/066* (2013.01); *F01D 5/3015* (2013.01); *F02C 3/04* (2013.01); *F05D 2220/32* (2013.01); *F05D 2260/30* (2013.01)

(58) Field of Classification Search
CPC ... F01D 9/02; F01D 5/02; F01D 5/026; F01D 5/066; F01D 5/326; F01D 5/3007; F01D 5/3015; F01D 5/081; F01D 3/04; F05D 2220/32; F05D 2260/30
USPC ........................................................ 60/805
See application file for complete search history.

(56) References Cited

U.S. PATENT DOCUMENTS 8,740,554 B2 *  6/2014  Virkler ................. F01D 5/3015
                                                   415/173.7
2014/0086740 A1   3/2014  Arnold

FOREIGN PATENT DOCUMENTS

| EP | 1 277 917 A1 | 1/2003 |
| EP | 2 474 708 A2 | 7/2012 |

OTHER PUBLICATIONS

Extended European Search Report for Application No. 17 16 1173.4-1610 dated Aug. 10, 2017 (8 pp.).

* cited by examiner

*Primary Examiner* — Phutthiwat Wongwian
*Assistant Examiner* — Loren C Edwards
(74) *Attorney, Agent, or Firm* — Cantor Colburn LLP

(57) ABSTRACT

A disc of a gas turbine engine system with particular retaining ring placement and engagement implementation are provided. For example, the disc includes a disc bore including, a groove formed on an axially extending surface of the disc bore, wherein the groove includes a forward surface that extends radially into the disc bore to a groove floor that is cut into the disc bore, and wherein the groove extends axially to an aft surface that extends radially outward to at least the axially extending surface of the disc bore, and a disc web that extends radially outward from the disc bore, relative to an axis of rotation of the gas turbine engine.

13 Claims, 5 Drawing Sheets

RETAINING RING GROOVE SUBMERGED INTO DISC BORE OR HUB

BACKGROUND

The subject matter disclosed herein generally relates to attaching a disc and cover plate and, more particularly, to attaching a disc and cover plate with a retention ring.

Gas turbine engines, such as those used to power modern commercial and military aircrafts, generally include a compressor section to pressurize airflow, a combustor section for burning hydrocarbon fuel in the presence of the pressurized air, and a turbine section to extract energy from the resultant combustion gases. The airflow flows along a gas path between components through the gas turbine engine.

Accordingly, a gas turbine engine includes a plurality of rotating and static components arranged axially along an axis of rotation of the gas turbine engine, in both the compressor section and the turbine section. For example, the gas turbine engine includes a plurality of discs arranged in an axial direction that extend radially outward from the central axis of rotation. These discs also have cover plates that are coupled to the discs.

Accordingly there is a desire to find ways to connect the disc and cover plate.

SUMMARY

According to one embodiment a disc for a gas turbine engine is provided. The disc includes a disc bore including, a groove formed on an axially extending surface of the disc bore, wherein the groove includes a forward surface that extends radially into the disc bore to a groove floor that is cut into the disc bore, and wherein the groove extends axially to an aft surface that extends radially outward to at least the axially extending surface of the disc bore, and a disc web that extends radially outward from the disc bore, relative to an axis of rotation of the gas turbine engine.

In addition to one or more of the features described above, or as an alternative, further embodiments of the gas turbine engine may include wherein the disc bore further includes an interstage coupling disposed on the axially extending surface at a peripheral aft edge of the disc bore that includes a protrusion that extends axially in the aft direction beyond an aft surface of the disc bore.

In addition to one or more of the features described above, or as an alternative, further embodiments of the gas turbine engine may include the disc further including a disc blade attachment connected to the disc web at an end of the disc web opposite the disc bore, wherein the disc blade attachment extends radially outward, wherein the disc blade attachment in configured to attach an airfoil to an upper surface of the disc blade attachment.

In addition to one or more of the features described above, or as an alternative, further embodiments of the gas turbine engine may include the disc further including a cover plate that extends from the disc blade attachment radially along an outside surface of the disc web toward the disc bore creating a cavity between the cover plate and disc web.

In addition to one or more of the features described above, or as an alternative, further embodiments of the gas turbine engine may include the disc further including a retaining ring configured to engage with the groove between the cover plate and disc.

In addition to one or more of the features described above, or as an alternative, further embodiments of the gas turbine engine may include wherein the retaining ring connects to the interstage coupling of the disc bore and extends into the groove.

In addition to one or more of the features described above, or as an alternative, further embodiments of the gas turbine engine may include wherein the groove includes a depth that extends radially into the disc bore, and wherein the retaining ring expands into the depth when a compressing force is applied between the cover plate and disc.

In addition to one or more of the features described above, or as an alternative, further embodiments of the gas turbine engine may include wherein the interstage coupling is configured to couple the disc to a second adjacent disc.

In addition to one or more of the features described above, or as an alternative, further embodiments of the gas turbine engine may include wherein the groove is located adjacent to the interstage coupling.

In addition to one or more of the features described above, or as an alternative, further embodiments of the gas turbine engine may include wherein the cover plate and disc hold the retaining ring in place, and wherein the cover plate and disc hold positions relative to each other when connected using the retaining ring.

According to one embodiment a rotor assembly for a gas turbine engine is provided. The rotor assembly includes at least one disc, the disc including a disc bore including, a groove formed on an axially extending surface of the disc bore, wherein the groove includes a forward surface that extends radially into the disc bore to a groove floor that is cut into the disc bore, and wherein the groove extends axially to an aft surface that extends radially outward to at least the axially extending surface of the disc bore, and a disc web that extends radially outward from the disc bore, relative to an axis of rotation of the gas turbine engine, a disc blade attachment connected to the disc web at an end of the disc web opposite the disc bore, wherein the disc blade attachment extends radially outward, a cover plate that extends from the disc blade attachment radially along an outside surface of the disc web toward disc bore creating a cavity between the cover plate and disc web, a retaining ring configured to engage with the groove between the cover plate and disc, and an airfoil extending radially outward and connected to an upper surface of the disc blade attachment of the disc.

In addition to one or more of the features described above, or as an alternative, further embodiments of the rotor assembly may include wherein the disc further includes an interstage coupling disposed on the axially extending surface at a peripheral aft edge of the disc bore that includes a protrusion that extends axially in the aft direction beyond an aft surface of the disc bore, and In addition to one or more of the features described above, or as an alternative, further embodiments of the rotor assembly may include the rotor assembly including a plurality of discs, a plurality of disc blade attachments, a plurality of cover plates, a plurality of retaining rings, and a plurality of airfoils.

In addition to one or more of the features described above, or as an alternative, further embodiments of the rotor assembly may include wherein the rotor is one selected from a group consisting of a compressor rotor, a combustor rotor, and a turbine rotor.

In addition to one or more of the features described above, or as an alternative, further embodiments of the rotor assembly may include wherein the retaining ring connects to the interstage coupling of the disc bore and extends into the groove.

In addition to one or more of the features described above, or as an alternative, further embodiments of the rotor assembly may include wherein the groove includes a depth that extends radially into the disc bore, and wherein the retaining ring expands into the depth when a compressing force is applied between the cover plate and disc.

In addition to one or more of the features described above, or as an alternative, further embodiments of the rotor assembly may include wherein the interstage coupling is configured to couple the disc to a second adjacent disc.

In addition to one or more of the features described above, or as an alternative, further embodiments of the rotor assembly may include wherein the groove is located adjacent to the interstage coupling.

In addition to one or more of the features described above, or as an alternative, further embodiments of the rotor assembly may include wherein the cover plate and disc hold the retaining ring in place, and wherein the cover plate and disc hold positions relative to each other when connected using the retaining ring.

According to one embodiment a gas turbine engine is provided. The gas turbine engine includes a turbine section, a combustor section to provide combustion gases to the turbine section, and a compressor section to compress an airflow and direct the compressed airflow toward the combustor, and a rotor disposed in at least one of the turbine section and compressor section, the rotor including at least one disc, the disc including a disc bore including, a groove formed on an axially extending surface of the disc bore, wherein the groove includes a forward surface that extends radially into the disc bore to a groove floor that is cut into the disc bore and extends axially to an aft surface that extends radially outward to at least the axially extending surface of the disc bore, and an interstage coupling disposed on the axially extending surface at a peripheral aft edge of the disc bore that includes a protrusion that extends axially in the aft direction beyond an aft surface of the disc bore, and a disc web that extends radially outward from the disc bore, relative to an axis of rotation of the gas turbine engine, a disc blade attachment connected to the disc web at an end of the disc web opposite the disc bore, wherein the disc blade attachment extends radially outward, a cover plate that extends from the disc blade attachment radially along an outside surface of the disc web toward disc bore creating a cavity between the cover plate and disc web, a retaining ring configured to engage with the groove between the cover plate and disc, and an airfoil extending radially outward and connected to an upper surface of the disc blade attachment of the disc.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
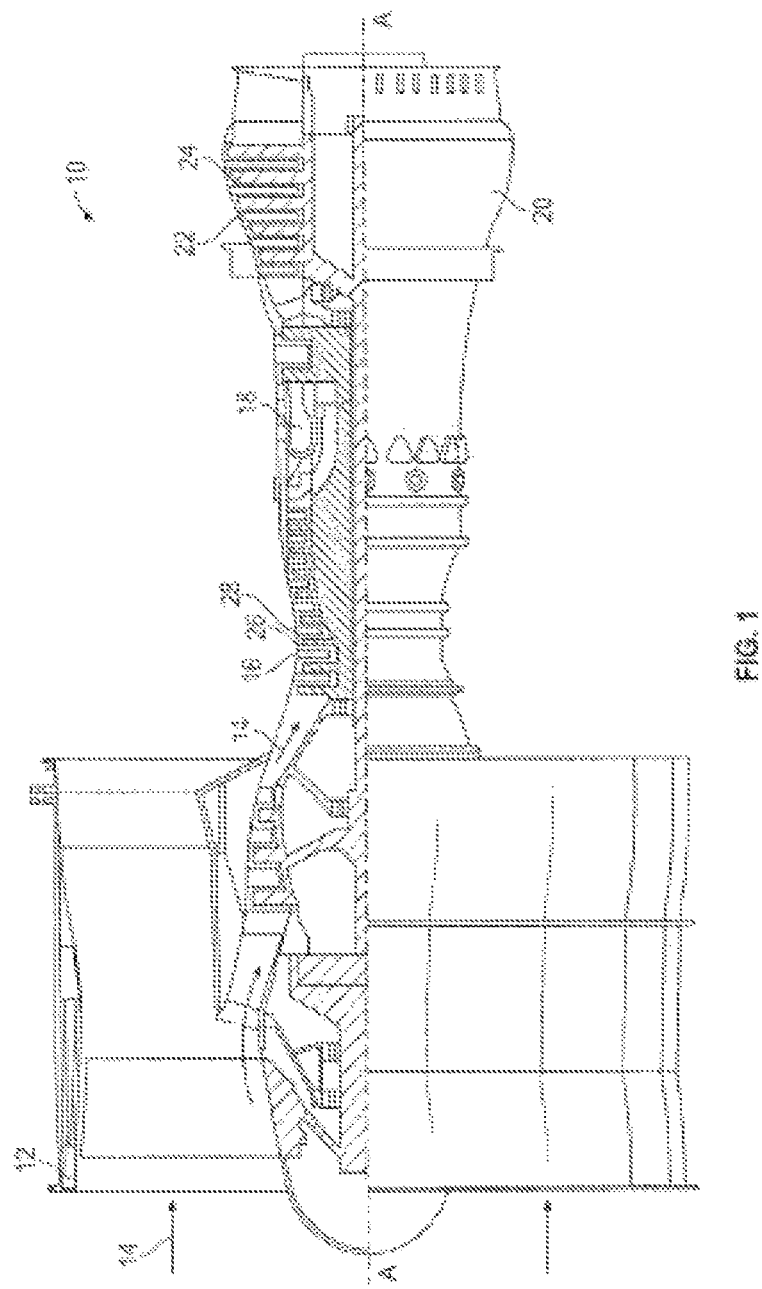
FIG. 1 illustrates a schematic cross-sectional view of a gas turbine engine in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In some instances a retaining ring is placed between a disc and cover plate at a point of contact along a web portion of the disc. Specifically, an appendage or protrusion extending axially in an aft direction from the web portion of the disc extends out and then curve radially outward to form a ring groove. These appendages/protrusions provide the point at which a retaining ring can be provided for coupling the disc to a cover plate. The protrusions may be provided extending anywhere along the web portion of the disc. For example, the protrusions, rings, and cover plate connection point can be provided in a mid-section of the web of the disc, at the top of the web portion, at a point in-between, lower along the web, or a combination of positions along the web.

However, such a groove forming protrusion extending from a side of the web portion of a disc occupies space that could otherwise be left open or occupied by another feature of a gas engine turbine. Further such a protrusion extending from the side of the web portion of the disc can provide for a more complex disc manufacturing process. Additionally, such a protrusion has restricted structural strength and integrity limited by the thin dimensions of the appendage/protrusion.

Embodiments described herein are directed to a retaining ring groove that is submerged into disc of a rotor. The rotor may be a compressor rotor or turbine rotor and may include a plurality of similar discs each having a similar groove. Further, the rotor is part of a gas turbine engine. Particularly, the groove is located on a surface of a disc bore portion or hub portion of the disc. The groove is configured for a retaining ring, for example, a Z ring and may therefore also be called a Z ring groove.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10. In some embodiments, the turbine 20 includes one or more turbine stators 22 and one or more turbine rotors 24. Likewise, the compressor 16 includes one or more compressor rotors 26 and one or more compressor stators 28. It is to be appreciated that while description below relates to turbine rotors 24, one skilled in the art will readily appreciate that the present disclosure may be utilized with respect to compressors 16.

As shown, a forward direction is defined as a direction going left, parallel to axis A, toward the fan section 12 found at a forward most position of the gas engine turbine. An aft direction is defined as a direction going to the right, parallel to axis A, back toward the back of the gas engine turbine toward. Particularly, the aft direction extends toward the turbine stators 22 which are in an aft most position. For example, as shown, the ambient air is propelled in the aft direction as shown by arrow 14 which points in the aft direction.

Further, components may be provided that extend either radially and/or axially with respect to axis A which is the axis that axially traverses through the center of the gas turbine engine. Particularly, as shown, the axis A traverses axially from a forward to an aft position of the gas turbine engine. Thus, a radial direction, or radially extending, is defined as extending in a direction substantially perpendicular to the axis A. Additionally, if the radial direction is extending toward the axis A that can be defined as radially extending inward, or inward radial expansion. It follows that when the radial direction extends away from the axis A that is defined as radially extending outward, or outward radial expansion. Further, an axial direction, or axially extending, is defined as extending is a direction substantially parallel to the axis A. Additionally, the axial direction may extend in a forward or aft direction.

Figure 2:
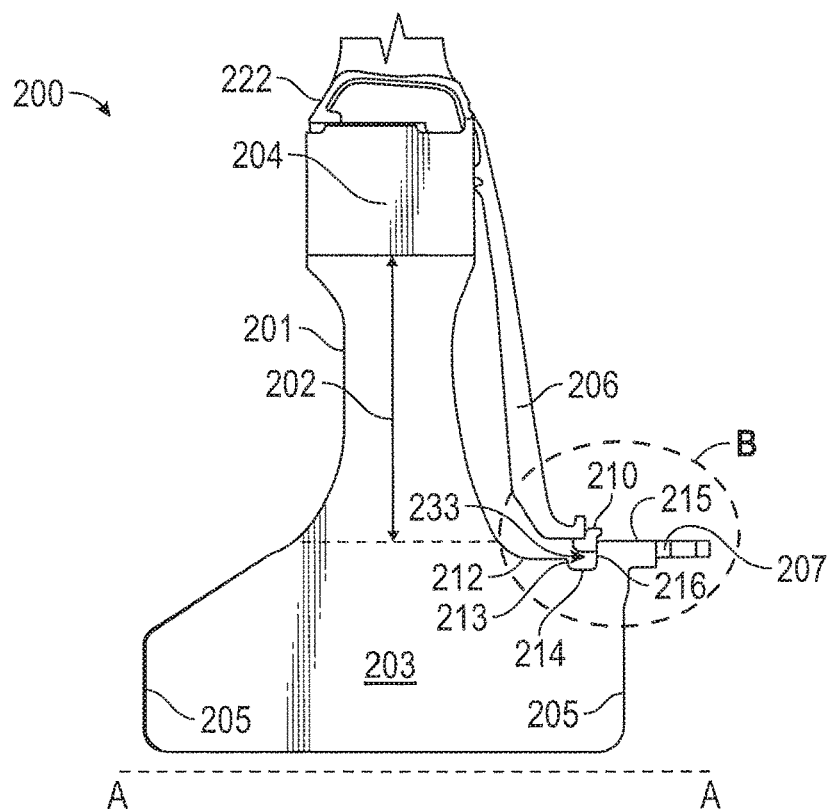
FIG. 2 illustrates a schematic cross-sectional view of a disc of a gas turbine engine that is connected to a cover plate in accordance with one or more embodiments of the present disclosure.

FIG. 2 illustrates a schematic cross-sectional view of a disc apparatus 200 of a gas turbine engine that is connected to a cover plate 206 in accordance with one or more embodiments of the present disclosure. As shown, a disc 201 is provided which is part of a rotor that can be included within any of the rotors in a gas turbine engine as shown in FIG. 1. The disc 201 includes at least three components, and may include various surface components. For example, in accordance with one or more embodiments and as shown in FIG. 2, the disc 201 includes a disc web 202 forming a middle portion of the disc 201 radially extending between a disc bore 203 and a blade attachment 204.

The disc blade attachment 204 which is attached to an outer diameter of the disc web 202 as shown. That is, the disc blade attachment 204 is connected to an outermost axially extending surface the disc web 202 and extends radially outward from the disc web 202. An airfoil 222, which may be for example a blade, connects and extends radially outward from the disc blade attachment. The disc bore 203 is the portion of the disc 201 that is nearest the rotational axis A of the gas turbine engine (e.g., as shown in FIG. 1). As shown, the disc bore 203 is wider, in the axial direction, than both the disc web 202 and the disc blade attachment 204. Accordingly, there are provided an axially extending surface 212 at the peripheral ends 205 of the disc bore 203 which the disc web's 202 sides curve and terminate into.

On an aft facing side of the disc 201, a cover plate 206 may be configured and installed to extend from the disc blade attachment 204 to a portion of the disc bore 203, as discussed below. The cover plate 206 may form an interference fit or other engagement with the disc blade attachment 204 at an outer diameter thereof and form a connection with a plate connector/groove 233 (reference to groove herein shall mean plate connector/groove) of the disc 201, as described below. Alternatively, a cover plate 206 may be configured and installed on a forward facing side of the disc 201 to extend from the disc blade attachment 204 to a portion of the disc bore 203.

According to one or more embodiments, the disc also includes a retaining ring 210 that is configured to retain the cover plate 206 in place with respect to the disc 201 when engaged into the groove 233. In accordance with some embodiments, the retaining ring 210 can be a Z ring, as known in the art. For example, a Z ring is a retaining ring that is substantially z shaped in cross section. The retaining ring 210 is provided along the axially extending surface 212 where the groove 233 meets the interstage coupling 207. As shown the cover plate 206 extends radially to cover the disc web 202, or a portion thereof leaving the area along the disc web for other components or elements such as radial snaps discussed and shown below in FIG. 6. Rather, the cover plate 206 engages the retaining ring 210 that engaged the groove 233 on the disc bore 203.

Specifically, looking within area B as shown in FIG. 2, in accordance with one or more embodiments, the interstage coupling 207, which is part of and extends from the disc bore 203, includes a forward facing side 216. The interstage coupling 207 also includes a protrusion extending from the forward edge 216 in the aft direction a length of an axially extending surface 215 and is configured to connect the disc apparatus 200 to another disc in the rotor. The forward facing side 216 of the interstage coupling is also an aft surface 216 of the groove 233. The forward edge 216, which is also the aft surface 216 of the groove 233, is where the retaining ring 210 engages along with also potentially engaging with the axially extending surface 215. The groove 233 is defined by a forward surface 213, a groove floor 214, and the aft surface 216. The groove 233 cuts into the axially extending surface 212 of the disc bore 203 such that the groove floor 214 is depressed within the axially extending surface 212 by a distance equal to the length of the forward surface 213 of the groove 233. Further, the groove 233 is defined by the aft surface 216 which extends radially further than the forward surface 213 as shown.

The forward surface 213 of the groove 233 is configured with a height such that the forward surface 213 prevents the retaining ring from falling, dropping, or walking forward during assembly. Accordingly, one or more embodiments disclosed herein places the groove 233 in an area where it has not been before, particularly, cut into the disc bore 203 geometry rather than extending from the disc web 202.

Figure 3:
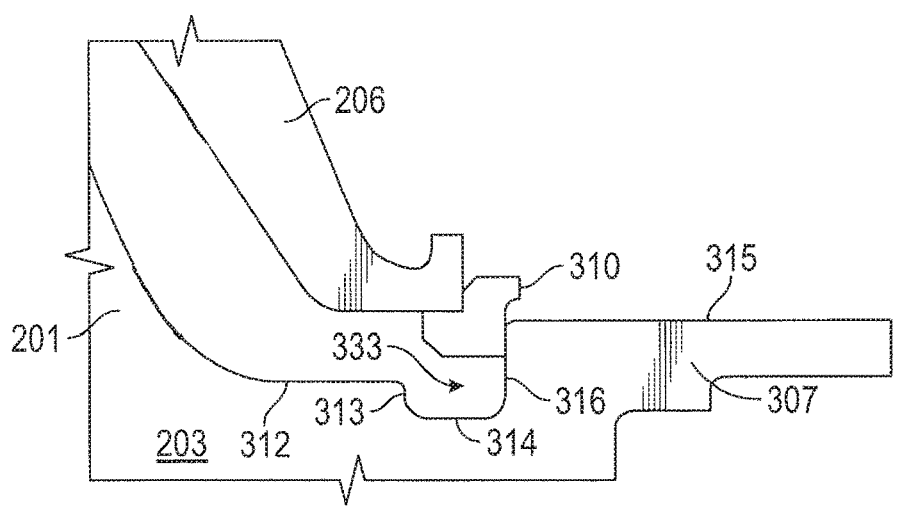
FIG. 3 illustrates a schematic cross-sectional view of area B of FIG. 2 including a portion of the disc and cover plate of a gas turbine engine beginning to engage and connect in accordance with one or more embodiments of the present disclosure.

FIG. 3 illustrates a schematic cross-sectional view of area B of FIG. 2 including a portion of the disc 201 and cover plate 206 of a gas turbine engine beginning to engage and connect in accordance with one or more embodiments of the present disclosure. The cover plate includes an axial and radial surface for connecting with the retaining ring 310. The disc 201 includes the disc bore 203 which includes both the groove 333 and an interstage coupling 307. As shown, the forward surface of the interstage coupling 307 is also the aft surface 316 of the groove 333. The groove 333 includes the aft surface 316, a groove floor 314, and a forward surface 313. The groove 333 cuts into an axially extending surface 312 of the disc bore 203. Further, the forward surface extends from the axially extending surface 312 to the groove floor 314 which is shorter than the aft surface 316 which extends from the groove floor 314 up to the axially extending surface 315 of the interstage coupling 307.

As shown, when the retaining ring 310 is assembled it engages to connect the disc 201 and cover plate 206, the retaining ring 310 engages with the axial and aft surfaces of the cover plate 206. The retaining ring 310 also engages with the aft surface 316 of the groove 333. This initial engagement limits and controls the forward and aft movement of the cover plate 206 and disc 201.

Figure 4A:
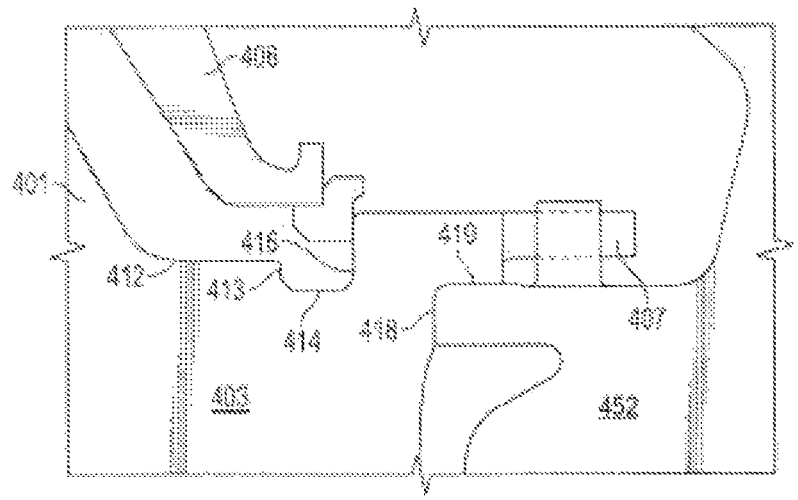
FIG. 4A illustrates a schematic cross-sectional view of a portion of a first disc and a second disc of a gas turbine engine connected using an interstage coupling in accordance with one or more embodiments of the present disclosure.

FIG. 4A illustrates a schematic cross-sectional view of a portion of a first disc 401 and a second disc 452 of a gas turbine engine connected using an interstage coupling in accordance with one or more embodiments of the present disclosure. Particularly, as shown the interstage coupling 407 is engaged with an interstage coupling of the second disc 452 such that an aft surface 418 and axial surface 419 of the interstage coupling 407 are engaged with a forward surface 418 and axially extending surface 419 of the second disc 452.

Further, the interstage coupling 407 also includes a groove on a forward side such that the interstage coupling 407 is configured to also connect and engage with a cover plate 406. The groove includes an aft surface 416 which is also the forward surface of the interstage coupling 407. Further, the groove includes a groove floor 414 and a forward surface 413 than cuts into an axially extending surface 412 of a disc bore 403. The groove is configured to engage and connected with a retaining ring and cover plate 406. Accordingly, rather than providing separate elements, the interstage coupling 407 can function as both the groove and an interstage coupling 407 with the second disc 452 as shown.

Figure 4B:
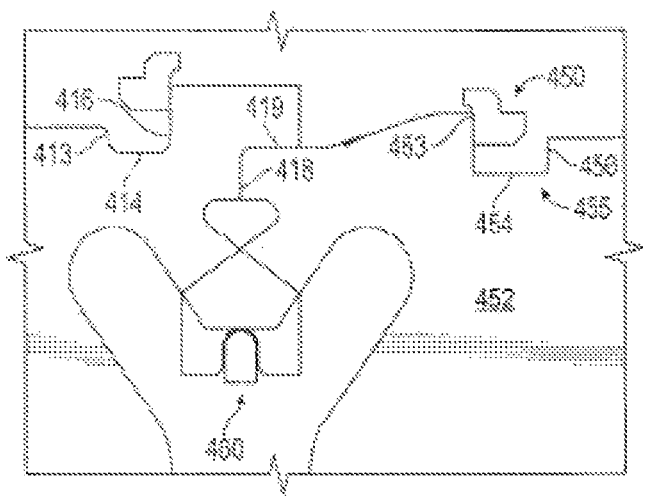
FIG. 4B illustrates a schematic cross-sectional view of a portion of another first disc and a second disc of a gas turbine engine connected using another interstage coupling in accordance with one or more embodiments of the present disclosure.

FIG. 4B illustrates a schematic cross-sectional view of a portion of another first disc and a second disc of a gas turbine engine connected using another interstage coupling in accordance with one or more embodiments of the present disclosure. As shown, the interstage coupling between the first disc and second disc may additionally include a second retention ring 460 to prevent interstage decoupling. As shown the other element are substantially similar in location with those shown in FIG. 4A. For example the interchange coupler surfaces 418 and 419 engage with similar surfaces of the second disc as those shown in FIG. 4A. However, as shown in this embodiment of FIG. 4B, the shape of the different elements are slightly varied. Further, according to another embodiment as shown, the second disc may have a forward provided retaining ring 450 configured to connect other elements with the second disc. The second disc also includes a second groove 455 that has a forward surface 453 that is also the aft surface of the second interstage coupling. The groove 455 also includes a groove floor 454 and an aft surface 456. The groove floor 454 is cut into the surface of the second disc a distance equal to the length of the aft surface 456. As shown, the groove 455 is configured to engage and connect with the retaining ring 450.

Figure 5A:
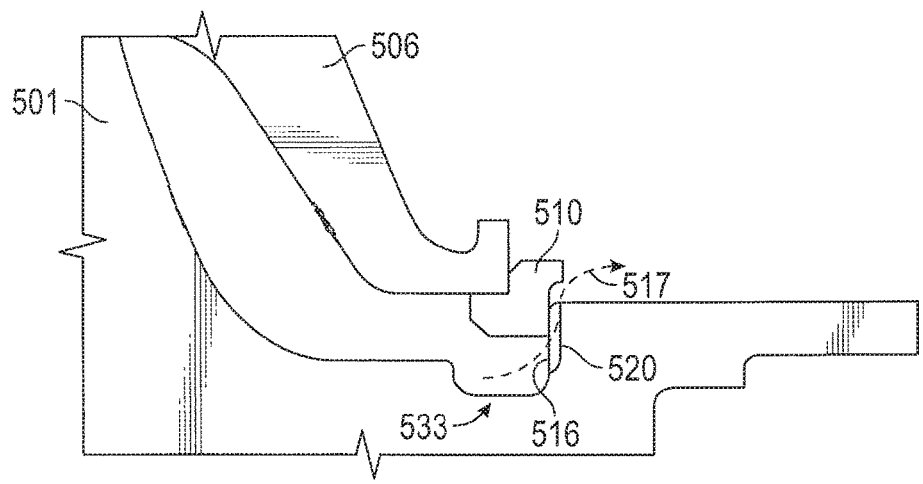
FIG. 5A illustrates a schematic cross-sectional view of a portion of a disc of a gas turbine engine that includes a scallop in accordance with one or more embodiments of the present disclosure.

FIG. 5A illustrates a schematic cross-sectional view of a portion of a disc 501 of a gas turbine engine that includes a scallop 520 in accordance with one or more embodiments of the present disclosure. As shown a retaining ring 510 is engaged and connecting a cover plate 506 with the disc 501. The scallop 520 is cut into the aft surface 516 of the groove 533. Accordingly, the scallop 520 provides a flow path for fluid or gas to pass through as indicated by flow line 517.

Figure 5B:
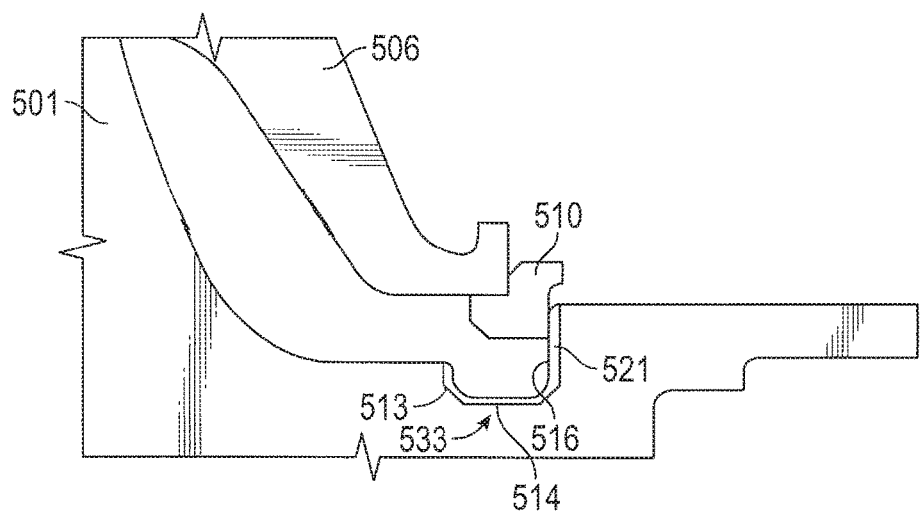
FIG. 5B illustrates a schematic cross-sectional view of a portion of a disc of a gas turbine engine that includes a scallop in accordance with one or more embodiments of the present disclosure.

FIG. 5B illustrates a schematic cross-sectional view of a portion of a disc 501 of a gas turbine engine that includes a scallop 521 in accordance with one or more embodiments of the present disclosure. As shown a retaining ring 510 is engaged and connecting a cover plate 506 with the disc 501. The scallop 521 is cut into all three surfaces of the groove 533. Specifically, as shown the scallop 521 cuts along the forward surface, 513, the groove floor 514, and the aft surface 516. Accordingly, the scallop 521 provides a flow path for fluid or gas to pass through even in the event that the retaining ring 510 is lower and compressed into the groove 533 cavity.

Figure 6:
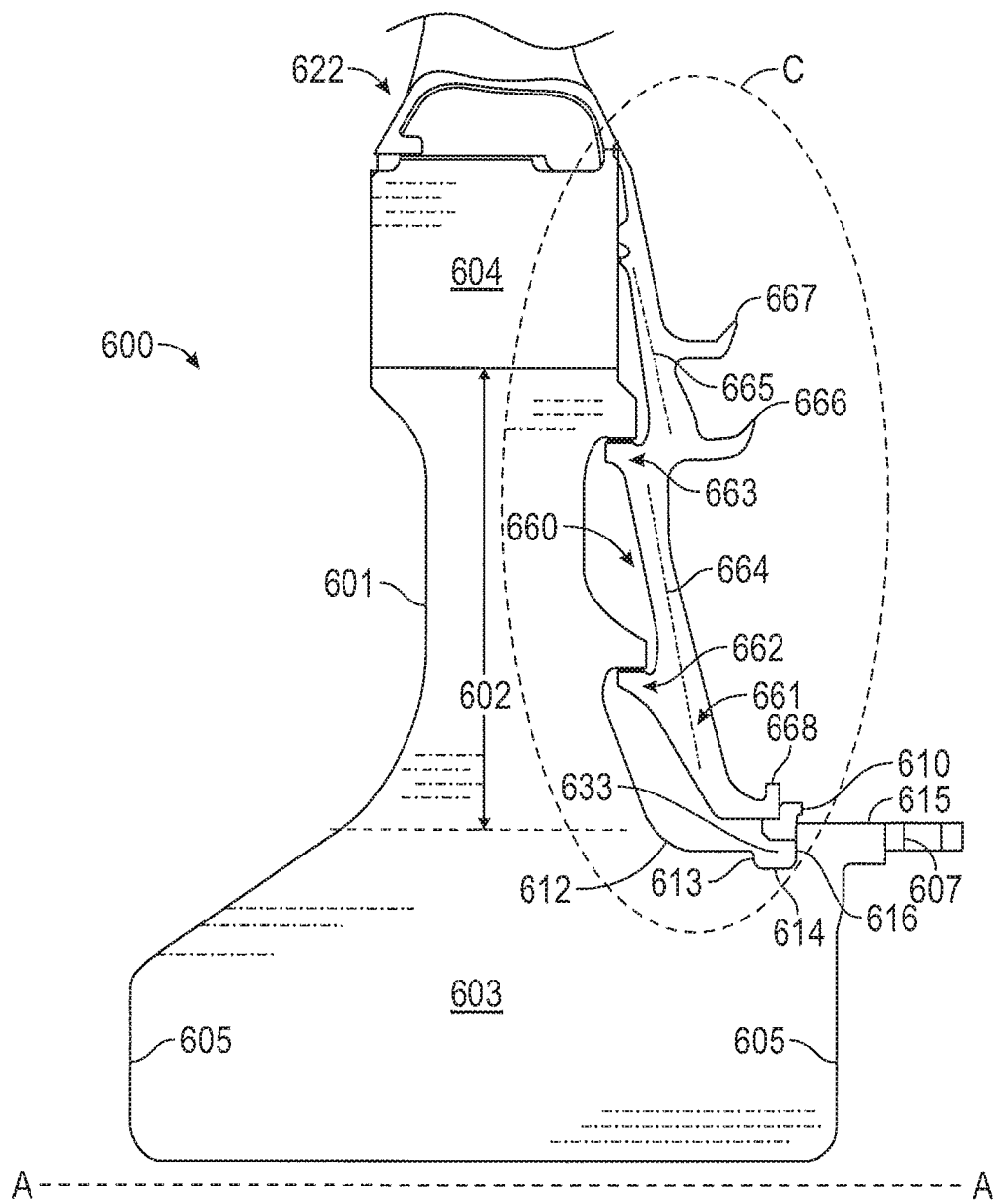
FIG. 6 illustrates a schematic cross-sectional view of a cover plate of a gas turbine engine that is connected to a disc in accordance with one or more embodiments of the present disclosure.

FIG. 6 illustrates a schematic cross-sectional view of a cover plate 660 of a gas turbine engine that is connected to a disc apparatus 600 in accordance with one or more embodiments of the present disclosure. As shown, a disc 601 is provided which is part of a rotor that can be included within any of the rotors in a gas turbine engine as shown in FIG. 1. The disc 601 includes at least three components, and may include various surface components. For example, in accordance with one or more embodiments and as shown in FIG. 6, the disc 601 includes a disc web 602 forming a middle portion of the disc 601 radially extending between a disc bore 603 and a blade attachment 604.

The disc blade attachment 604 which is attached to an outer diameter of the disc web 602 as shown. That is, the disc blade attachment 604 is connected to an outermost axially extending surface the disc web 602 and extends radially outward from the disc web 602. An airfoil 622, which may be for example a blade, connects and extends radially outward from the disc blade attachment. The disc bore 603 is the portion of the disc 601 that is nearest the rotational axis A of the gas turbine engine (e.g., as shown in FIG. 1). As shown, the disc bore 603 is wider, in the axial direction, than both the disc web 602 and the disc blade attachment 604. Accordingly, there are provided an axially extending surface 612 at the peripheral ends 605 of the disc bore 603 which the disc web's 602 sides curve and terminate into.

On an aft facing side of the disc 601, a cover plate 660 may be configured and installed to extend from the disc blade attachment 604 to a portion of the disc bore 603, as discussed below. The cover plate 660 may form an interference fit or other engagement with the disc blade attachment 604 at an outer diameter thereof and form a connection with a groove 633 of the disc 601, as described below. Alternatively, a cover plate 660 may be configured and installed on a forward facing side of the disc 601 to extend from the disc blade attachment 604 to a portion of the disc bore 603.

According to an embodiment, a cover plate is provided that uses two radial snaps to transfer load into the disc and has a feature to enable the use of a z-ring (retaining ring) to keep it axially attached to the disc. Additionally, the retaining ring is located in the bore region of the disc.

For example, looking within area C as shown in FIG. 6, in accordance with one or more embodiments, the cover plate 660 includes an inner surface that faces in a forward direction toward the disc 601 and an outer surface that faces away from the disc 601 in an aft direction. The cover plate 660 extends radially from the groove 633 at the disc bore 603 radially upward along an outside surface of the disc creating a cavity between the cover plate 660 and disc 601. The cover plate 660 includes two snaps, a first snap 662 and a second snap 663 that are configured to connect to the disc web 602. Specifically, the first snap 662 extends axially in a forward direction through the cavity formed between the disc 601 and cover plate 660 far enough to connect with a surface of the disc web 602. Similarly, the second snap 663 extends axially in the forward direction through the cavity far enough to connect with a surface of the disc web 602. The first snap 662 can also be called an inner snap 662 because it is located radially inward along the body of the cover plate 660 as compared to the second snap 663 which can be call the outer snap 663 because it is located radially further out along the body of the cover plate 660.

The cover plate 660 also extends radially inward to form an attachment protrusion 661 for a retaining ring 610 that secures the cover plate 660 to the disc 601 at the disc bore 603. The attachment protrusion 661 maintains a similar axial thickness as the other regions 664 and 665 of the cover plate 660. According to another embodiment, the attachment protrusion 661 may also be a full ring member 661 formed to connect with the retention ring 610. A full ring member 661 can provide structural benefits.

Further, the cover plate 660 includes radially staggered knife edges 666 and 667. The first knife edge 666 is formed at the top of a protrusion that extends axially in an aft direction and then radially outward. The second knife edge 667 extends from its own protrusion that also extends axially in the aft direction and then radially outward. According to an embodiment, the radially staggered knife edges 666, 667 are in close proximity to second snap 663, which can also be called the outer snap 663, in order to restrain deflections.

Additionally, according to another embodiment, a puller protrusion 668 can be formed at the tip of the attachment protrusion 661. The puller protrusion extends radially outward from the tip of the attachment protrusion 661 of the cover plate 660. The puller protrusion may be used to help pull the cover plate 660 away from being engaged with the disc 601.

Further, according to another embodiment, the cover plate 660 can be formed of two substantially straight angled portions 664, 665 that extend radially to form the body of the cover plate 660. This cover plate 660 shape, which includes two substantially straight angled portions 664, 665, may help restrain deflections. Additionally, according to another embodiment, the cover plate 660 can reduce stress and better transfer load to the disc.

According to one or more embodiments, the disc also includes a retaining ring 610 that is configured to retain the cover plate 660 in place with respect to the disc 601 when engaged into the groove 633. In accordance with some embodiments, the retaining ring 610 can be a Z ring, as known in the art. For example, a Z ring is a retaining ring that is substantially z shaped in cross section. The retaining ring 610 is provided along the axially extending surface 612 where the groove 633 meets the interstage coupling 607. As shown the cover plate 660 extends radially to cover the disc web 602, or a portion thereof, with two snaps 662 and 663 that connect to the disc web 602. The cover plate 660 also engages the retaining ring 610 that engaged the groove 633 on the disc bore 603.

According to one or more embodiments, the interstage coupling 607, which is part of and extends from the disc bore 603, includes a forward facing side 616. The interstage coupling 607 also includes a protrusion extending from the forward edge 616 in the aft direction a length of an axially extending surface 615 and is configured to connect the disc apparatus 600 to another disc in the rotor. The forward facing side 616 of the interstage coupling is also an aft surface 616 of the groove 633. The forward edge 616, which is also the aft surface 616 of the groove 633, is where the retaining ring 610 engages along with also potentially engaging with the axially extending surface 615. The groove 633 is defined by a forward surface 613, a groove floor 614, and the aft surface 616. The groove 633 cuts into the axially extending surface 612 of the disc bore 603 such that the groove floor 614 is depressed within the axially extending surface 612 by a distance equal to the length of the forward surface 613 of the groove 633. Further, the groove 633 is defined by the aft surface 616 which extends radially further than the forward surface 613 as shown.

The forward surface 613 of the groove 633 is configured with a height such that the forward surface 613 prevents the retaining ring from dropping or walking forward during assembly. Accordingly, one or more embodiments disclosed herein places the groove 633 in an area where it has not been before, particularly, cut into the disc bore 603 geometry rather than extending from the disc web 602.

Thus, in accordance with one or more embodiments, the retaining ring, which may be a Z-Ring, and groove, once provided as disclosed above, can help remove features from the surfaces of the cover plate and the disc web which can reduce the number of life limiting area on the components, or can help free up space previously used by the retaining portion for other features and elements as discussed in one or more embodiments herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A disc for a rotor assembly of a gas turbine engine, the disc comprising:
   a disc web,
   a disc blade attachment extending in a first radial direction from the disc web, the first radial direction being a radial outward direction,
   a disc hub extending in a second radial direction from the disc web, the second radial direction being a radial inward direction, a cover plate connecting on a first axial side of the disc hub and at least one of the disc web and the disc blade attachment, wherein the first axial side of the disc hub is disposed in a first axial direction from a center of the disc web, the disc hub including:

a first axially extending surface extending in the first axial direction, the first axially extending surface including a groove, wherein the groove includes a plurality of surfaces including: a first side surface that extends in the second radial direction from the first axially extending surface, a first bottom surface that extends in the first axial direction from the first side surface, and a second side surface that extends in the first radial direction from the first bottom surface, the second side surface being longer than the first side surface, a second axially extending surface extending in the first axial direction from the second side surface of the groove, wherein the second axially extending surface is spaced in the first radial direction from the first axially extending surface, an interstage coupling extending in the first axial direction from the second axially extending surface, the interstage coupling including a top surface that is radially aligned with the second axially extending surface and spaced in the first radial direction from the first axially extending surface, whereby each of the plurality of surfaces of surfaces of the groove are radially inward of the top surface of the interstage coupling.

2. The disc of claim 1 wherein the first axial side of the disc hub is an axial aft side and the first axial direction is an axial aft direction.

3. The disc of claim 1, further comprising:

a disc blade attachment connected to the disc web at an end of the disc web opposite the disc hub, wherein the disc blade attachment extends radially outward, wherein the disc blade attachment is configured to attach an airfoil to an upper surface of the disc blade attachment.

4. The disc of claim 1, wherein the cover plate connects with the groove through a retaining ring that expands in the second radial direction toward the groove bottom surface when a compressing force is applied between the cover plate and the disc.

5. The disc of claim 1, wherein the interstage coupling is configured to couple the disc to a second adjacent disc.

6. The disc of claim 1, wherein the cover plate and disc hold the retaining ring in place, and wherein the cover plate and disc hold positions relative to each other when connected using a retaining ring.

7. A rotor assembly for a gas turbine engine, the rotor assembly comprising:

at least one disc, the disc comprising:

a disc web, a disc blade attachment extending in a first radial direction from the disc web, the first radial direction being a radial outward direction, a disc hub extending in a second radial direction from the disc web, the second radial direction being a radial inward direction, a cover plate connecting to first axial side of the disc hub and at least one of the disc web and the disc blade attachment, wherein the first axial side of the disc hub is disposed in a first axial direction from a center of the disc web, the disc hub including:

a first axially extending surface extending in the first axial direction, the first axially extending surface including a groove, wherein the groove includes a plurality of surface including: a first side surface that extends in the second radial direction from the first axially extending surface, a first bottom surface that extends in the first axial direction from the first side surface, and a second side surface that extends in the first radial direction from the first bottom surface, the second side surface being longer than the first side surface, a second axially extending surface extending in the first axial direction from the second side surface of the groove, wherein the second axially extending surface is spaced in the first radial direction from the first axially extending surface, an interstage coupling extending in the first axial direction from the second axially extending surface, the interstage coupling including a top surface that is radially aligned with the second axially extending surface and spaced in the first radial direction from the first axially extending surface, whereby each of the plurality of surfaces of the groove are radially inward of the top surface of the interstage coupling, wherein the cover plate connects with the groove through a retaining ring that expands in the second radial direction toward the groove bottom surface when a compressing force is applied between the cover plate and the disc, and an airfoil extending radially outward and connected to an upper surface of the disc blade attachment of the disc.

8. The assembly of claim 7 wherein the first axial side of the disc hub is an axial aft side and the first axial direction is an axial aft direction.

9. The rotor assembly of claim 7, comprising a plurality of discs, a plurality of disc blade attachments, a plurality of cover plates, a plurality of retaining rings, and a plurality of airfoils.

10. The rotor assembly of claim 7, wherein the rotor assembly is one selected from a group consisting of a compressor rotor assembly, a combustor rotor assembly, and a turbine rotor assembly.

11. The rotor assembly of claim 7, wherein the interstage coupling is configured to couple the disc to a second adjacent disc.

12. The rotor assembly of claim 7, wherein the cover plate and disc hold the retaining ring in place, and wherein the cover plate and disc hold positions relative to each other when connected using a retaining ring.

13. A gas turbine engine comprising:

a turbine section, a combustor section to provide combustion gases to the turbine section, and a compressor section to compress an airflow and direct the compressed airflow toward the combustor section, and a rotor disposed in at least one of the turbine section and compressor section, the rotor comprising:

at least one disc, the disc comprising:

a disc web, a disc blade attachment extending in a first radial direction from the disc web, the first radial direction being a radial outward direction, a disc hub extending in a second radial direction from the disc web, the second radial direction being a radial inward direction, a cover plate connecting to a first axial side of the disc hub and at least one of the disc web and the disc blade attachment, wherein the first axial side of the disc hub is disposed in a first axial direction from a center of the disc web, the disc hub including:

a first axially extending surface extending in the first axial direction, the first axially extending surface including a groove, wherein the groove includes a plurality of surfaces including: a first side surface that extends in the second radial direction from the first axially extending surface, a first bottom surface that extends in the first axial direction from the first side surface, and a second side surface that extends in the first radial direction from the first bottom surface, the second side surface being longer than the first side surface, a second axially extending surface extending in the first axial direction from the second side surface of the groove, wherein the second axially extending surface is spaced in the first radial direction from the first axially extending surface, an interstage coupling extending in the first axial direction from the second axially extending surface, the interstage coupling including a top surface that is radially aligned with the second axially extending surface and spaced in the first radial direction from the first axially extending surface, whereby each of the plurality of surfaces of the groove are radially inward of the top surface of the interstage coupling, wherein the cover plate connects with the groove through a retaining ring that expands in the second radial direction toward the groove bottom surface when a compressing force is applied between the cover plate and the disc, and an airfoil extending radially outward and connected to an upper surface of the disc blade attachment of the disc.

\* \* \* \* \*